US011952257B2

(12) United States Patent
Knight

(10) Patent No.: US 11,952,257 B2
(45) Date of Patent: Apr. 9, 2024

(54) HIGH VOLUME RECIPROCATING DISPENSER FOR VISCOUS AND OTHER FOODSTUFFS

(71) Applicant: RIEKE PACKAGING SYSTEMS LIMITED, Leicester (GB)

(72) Inventor: Simon Christopher Knight, Bridgend (GB)

(73) Assignee: RIEKE PACKAGING SYSTEMS LIMITED (GB)

( * ) Notice: Subject to any disclaimer, the term of this patent is extended or adjusted under 35 U.S.C. 154(b) by 0 days.

(21) Appl. No.: 17/909,122

(22) PCT Filed: Mar. 3, 2021

(86) PCT No.: PCT/EP2021/055403
§ 371 (c)(1),
(2) Date: Sep. 2, 2022

(87) PCT Pub. No.: WO2021/175962
PCT Pub. Date: Sep. 10, 2021

(65) Prior Publication Data

US 2023/0102857 A1 Mar. 30, 2023

Related U.S. Application Data

(60) Provisional application No. 62/984,487, filed on Mar. 3, 2020.

(51) Int. Cl.
*B67D 1/10* (2006.01)
*B67D 1/12* (2006.01)
*B67D 1/08* (2006.01)

(52) U.S. Cl.
CPC ........... *B67D 1/102* (2013.01); *B67D 1/1256* (2013.01); *B67D 1/1281* (2013.01); *B67D 2001/0827* (2013.01)

(58) Field of Classification Search
CPC ............ B67D 2001/0827; B67D 1/102; B67D 1/1256; B67D 1/1281; B05B 11/1015;
(Continued)

(56) References Cited

U.S. PATENT DOCUMENTS 1,929,564 A * 10/1933 William ................ B05B 11/108 222/401
3,185,355 A * 5/1965 Lipman ................. B05B 1/3447 222/384
(Continued)

FOREIGN PATENT DOCUMENTS

EP 1075873 A2 2/2001

OTHER PUBLICATIONS

International Search Report and Written Opinion dated May 19, 2021; International Patent Application No. PCT/ EP2021/055403 filed Mar. 3, 2020. ISA/EP.

*Primary Examiner* — Charles P. Cheyney
(74) *Attorney, Agent, or Firm* — McDonald Hopkins LLC

(57) ABSTRACT

A fixed nozzle pump appropriate for food service and dispensing of other fluids of varying viscosities is contemplated. The components are modularly connectable for easy assembly and cleaning. A piston and sealing ring cooperate with the chamber extension formed in the pump body to facilitate reciprocating pump action while minimizing the number of components disposed in and exposed to the fluid flow path. A novel, injection-moldable valve is integrated on the dispensing nozzle. The entire assembly may be disposed within a container shell which itself includes a replaceable pouch filled with the fluid to be dispensed.

13 Claims, 7 Drawing Sheets

(58) Field of Classification Search

CPC ............... B05B 11/106; B05B 11/1001; B05B 11/0005; B05B 11/1007

USPC ..................... 222/383.1, 309, 32.9, 384, 385

See application file for complete search history.

(56) References Cited

U.S. PATENT DOCUMENTS

| | | | | | |
|---|---|---|---|---|---|
| 4,273,257 | A * | 6/1981 | Smith | G01F 11/028 | 422/934 |
| 4,306,670 | A * | 12/1981 | Oshikubo | G01F 11/028 | 422/934 |
| 4,526,294 | A * | 7/1985 | Hirschmann | G01F 11/023 | 73/864.18 |
| 4,739,904 | A * | 4/1988 | Spencer | B05B 11/1015 | 222/481 |
| 6,089,406 | A * | 7/2000 | Feldner | B67D 7/0205 | 222/105 |
| 6,422,434 | B1 | 7/2002 | Lammond et al. | | |
| 6,802,436 | B2 * | 10/2004 | Drennow | B67D 7/0277 | 222/207 |
| 7,377,408 | B2 | 5/2008 | Kasting | | |
| 7,938,297 | B2 | 5/2011 | Law | | |
| 8,827,121 | B2 | 9/2014 | Law | | |
| 8,960,507 | B2 | 2/2015 | Sciole | | |
| 9,790,933 | B2 * | 10/2017 | Park | F04B 9/14 | |
| 9,846,066 | B2 * | 12/2017 | Falcon | G01F 11/028 | |
| 10,926,279 | B2 * | 2/2021 | Ding | B05B 11/1015 | |
| 2019/0270109 | A1 * | 9/2019 | Lee | B67D 7/0205 | |

* cited by examiner

HIGH VOLUME RECIPROCATING DISPENSER FOR VISCOUS AND OTHER FOODSTUFFS

REFERENCE TO RELATED APPLICATIONS

This application is a 35 U.S.C. 371 national stage of PCT Application No. PCT/EP2021/055403 filed Mar. 3, 2021, entitled "HIGH VOLUME RECIPROCATING DISPENSER FOR VISCOUS AND OTHER FOODSTUFFS," which claims priority to U.S. Provisional Patent application No. 62/984,487, filed on Mar. 3, 2020 the disclosures of each of which are incorporated by reference herein.

TECHNICAL FIELD

This application relates generally to pump dispensers and, more specifically, to a fixed nozzle dispenser pump capable of dispensing foodstuffs and having a simplified construction for easy disassembly and cleaning.

BACKGROUND

Owing to their ability to deliver small doses of fluids from a bulk container, dispensing pumps coupled to containers find particular utility in the food service industry. Specifically, these arrangements allow food service providers to acquire foodstuffs in bulk and then subsequently and selectively use these items as toppings and/or flavorings as may be appropriate to the circumstances. Both sustainability and economic benefits can also be realized insofar as the container and pump combination itself can be cleaned and reused.

One example of a dispensing pump that is appropriate for use in the food service industry can be found in U.S. Pat. No. 8,960,507. Here, a weir is provided to prevent residue from building up within the dispensing channel/outlet of the pump. This pump, like many others (e.g., see U.S. Pat. Nos. 7,377,408 and 8,827,121) relies upon an actuator head that reciprocates along a portion of its axial length/extension. Setting aside whether these designs create sufficient suction to dispense foodstuffs, reciprocating pumps may not always be ideal for food service because the dispensing outlet moves in concert with the actuator head, thereby making it difficult to reliably deposit the dispensed product in a specific location.

Fixed nozzle dispensers provide an alternative to the foregoing reciprocating designs. Examples of fixed nozzle designs can be found in U.S. Pat. Nos. 4,739,904; 6,422,434; and 10,926,279. In each, a reciprocating plunger is provided above the dispensing nozzle, while the dip tube extends beneath the nozzle, thereby imparting a characteristic T-shape to the entirety of the pump assembly. Although these dispensers tend to have a larger profile, they can create sufficient suction to dispense water and more viscous foodstuffs (e.g., paste-like condiments, sauces, and other fluids, such as creams, ketchup, honey, mayonnaise, and the like).

A further consideration for food service pumps, irrespective of fixed or moving nozzle, relates to the ability to disassemble and clean the internal components. Often, these pumps involve a plurality of valves and other distinct structures that can be difficult to access, clean, and reassemble. Further, owing to the larger single-shot volumes often required in the food industry, food dispensers often require larger chambers and robust, sturdy components.

In view of the foregoing, a robust fixed nozzle pump dispenser with modular components that are easy to disassemble and clean would be welcome. Such a design should include features that allow for quick and easy attachment and use with bag-in-box style dispensing systems and, further, with a nozzle that prevents dripping and accumulation of dispensed product at and within the nozzle. Finally, excepting perhaps a biasing member, there is a need for these types of dispensers wherein the components are all constructed from recyclable thermoplastics (and, more preferably, a single type or single grade thereof).

THE INVENTION

Aspects of our proposals are set forth in the claims and following the description below of embodiments. In a general aspect, the proposals may relate to a fixed nozzle dispenser pump having a modular construction for convenient disassembly and assembly, especially for cleaning. The dispenser pump comprises a pump body element to define a pump chamber, and an actuator (plunger) reciprocable relative to the pump body element.

The pump body element may have a lower inlet end, a dispensing nozzle, and an upward tubular pump chamber extension, preferably a cylindrical tube. It may have an skirt or surround extending up coaxially around a lower portion of the pump chamber extension, with a gap between. The skirt or surround may have one or more projections to engage and locate a shroud component that extends upwardly around the pump chamber extension. A sealing ring is mounted at the top of the pump chamber extension, and may engage outwardly against the actuator.

The actuator may be in the general form of a cap. It may comprise a hollow tube closed at the top end, e.g. by a top panel, and coaxial with the tubular pump chamber extension of the body. The inside of the tube slidably engages the sealing ring of the tubular pump chamber extension. The tube may have engagement features disposed at a lower end, to couple an attachment (piston attachment, piston element, guide attachment). Preferably the coupling is detachable and attachable by rotation. This attachment may engage the outer face of the pump chamber extension, e.g. via a guide annulus or cylinder, to guide the actuator movement. The body element and actuator tube are in communication through the top of the tubular extension to form a pump chamber.

The dispenser nozzle may project out laterally, e.g. generally orthogonally, relative to the vertical or relative to the pump chamber extension. It may carry a nozzle adapter component, which may include an outlet valve. The nozzle adapter component may be detachably coupled at a distal edge or end of the dispenser nozzle.

The pump may comprise a base or base element detachably coupled to the body element, which may be for positioning the pump assembly in relation to a container of product to be dispensed, and may comprise or connect to a dip tube element. The base may couple detachably to the lower end of the body element, such as by respective engagement features of the base and body, which desirably couple/uncouple by rotational movement, especially by a bayonet coupling.

The pump has an inlet valve for the pump chamber, which may be provided by an inlet element interposed between the pump body element and a base element as described, the inlet element including an inlet valve.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

FIG. 1A is a three dimensional, perspective view of one aspect of the inventive pump enclosed within a dispensing container and shroud assembly, while

FIG. 3A is a three dimensional, perspective view of pump shown in FIG. 2A but with the pump chamber shroud excluded to better illustrate the keying projections formed on the pump body element. This perspective view is taken from the bottom of the pump so as to include and highlight the dip tube and piercing element.

FIG. 3B is a three dimensional, cross sectional perspective view taken along the horizontal plane coinciding with line 3-3 in FIG. 2A so as to bisect the keying projections on each side of the pump body element. This view illustrates the coaxial arrangement of the parts, as well as how the keying projections may be dislodged from their apertures in the shroud by applying squeezing force so as to temporarily deform the shroud.

FIG. 3C is a cross sectional side view of the aspect illustrated in FIG. 3A.

FIG. 3D is an isolated cross sectional perspective view of the pump chamber and its associated elements, with further reference to how these are disposed within the dispensing container contemplated in FIGS. 1A and 1B.

FIG. 3E is an isolated cross sectional side view of the nozzle adapter element.

DESCRIPTION

Figure 1A:
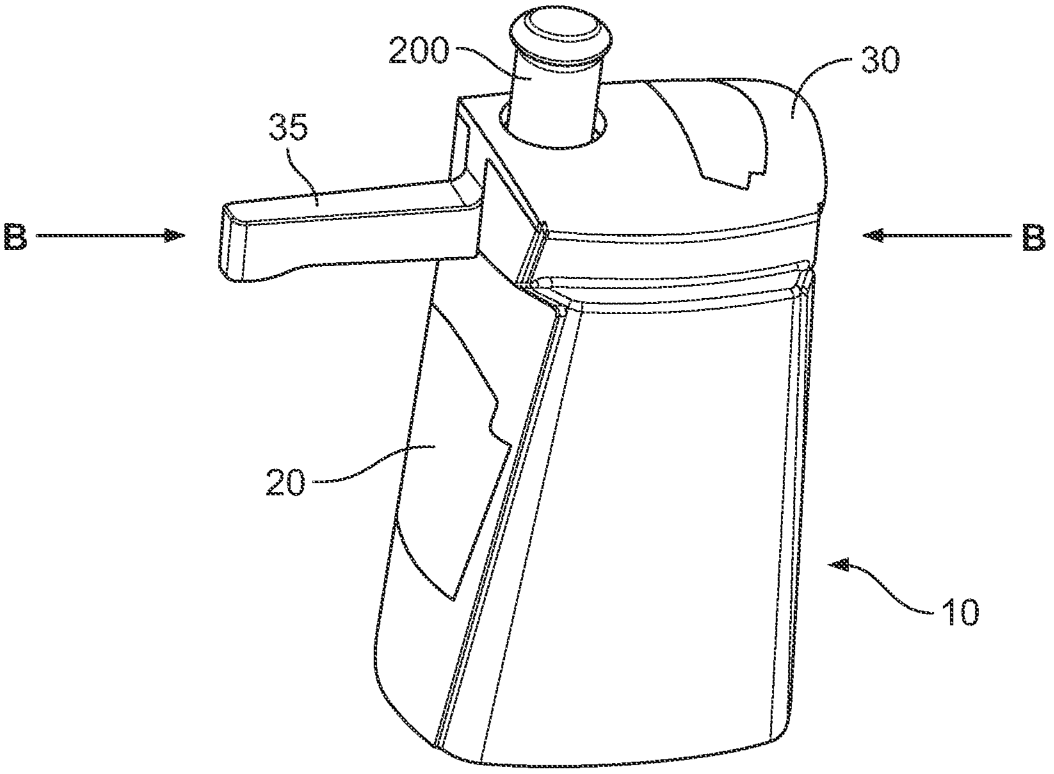

While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words “example” and “exemplary” mean an instance, or illustration. The words “example” or “exemplary” do not indicate a key or preferred aspect or embodiment. The word “or” is intended to be inclusive rather an exclusive, unless context suggests otherwise. As an example, the phrase “A employs B or C,” includes any inclusive permutation (e.g., A employs B; A employs C; or A employs both B and C). As another matter, the articles “a” and “an” are generally intended to mean “one or more” unless context suggest otherwise.

A robust high volume pump is contemplated. When disassembled, the components may be imparted with uniquely shaped interfaces (orientationally selective) so as to facilitate the intuitive re-assembly of the pump. That is, the anti-drip nozzle attachment may couple to the dispenser nozzle via a square or rectangular shaped connection. The attachment of the pump body element to the inlet base attachment may be by way of a multi-point, bayonet-style connection. In turn, the inlet base may connect to the container with its own unique winged bayonet, and the piston element or guide attachment may connect to the actuator cap by way of a threaded or rotatable connection. Further, many of these elements can all be made of a single thermoplastic resin to simplify manufacture and the potential end-of-life recycling of these components.

The pump engine itself is characteristic or unique in that an annular piston rides along the outside of the extension on the pump body defining the pumping chamber. An actuator stem or cup fits over that extension and screws onto the piston. Thus, the piston proper is the body extension carrying the sealing ring, and the actuator is the cylinder, but it can be regarded as the piston herein because of its reciprocating action. A spring may sit beneath the piston and remains captured between the pump chamber and an annular skirt extending around it. The entirety of these structures may themselves be concealed by a shroud, desirably compressible e.g. resiliently flexible, which may attach to and release from to the skirt by a key-projection attachment. This arrangement may eliminate any contact between the biasing spring and the dispensed fluid, while also providing for an easily disassembled structure having components with little to no gaps, recesses, or other hard-to-clean features.

The nozzle attachment may act as a single piece, anti-drip valve. Its straight edges and panels are particularly amenable to injection molding, while a simple post-molding operation creates a slit to serve as an outlet along the bottom-most, angled edge. The material for this attachment may be any of a variety of thermoplastic elastomer (TPE) materials for improved performance, including but not limited to grades most appropriate for food industry use.

A shroud is coaxially fitted over the actuator head and pump body element. The shroud connects via a separate, child-resistant style keyed fitting, and the shroud will desirably have sufficient resilience and flexibility to allow for engagement and disengagement of these features to allow for disassembly and cleaning of the pump internals.

The overall profile and assembly of these elements allows for the majority of the pump to be concealed within the container itself. This allows for a more attractive assembly with few, if any, obvious points that might be tampered with by end users. Notably, the container may include a storage shell configured to hold a replaceable pouch or bag filled with the fluid for dispensing, with a removable lid providing easy access to replace the pouch/bag. The lid includes an aperture to allow the reciprocating action of the actuator, while a covering extension can conceal the dispensing nozzle and adapter.

Figure 1B:
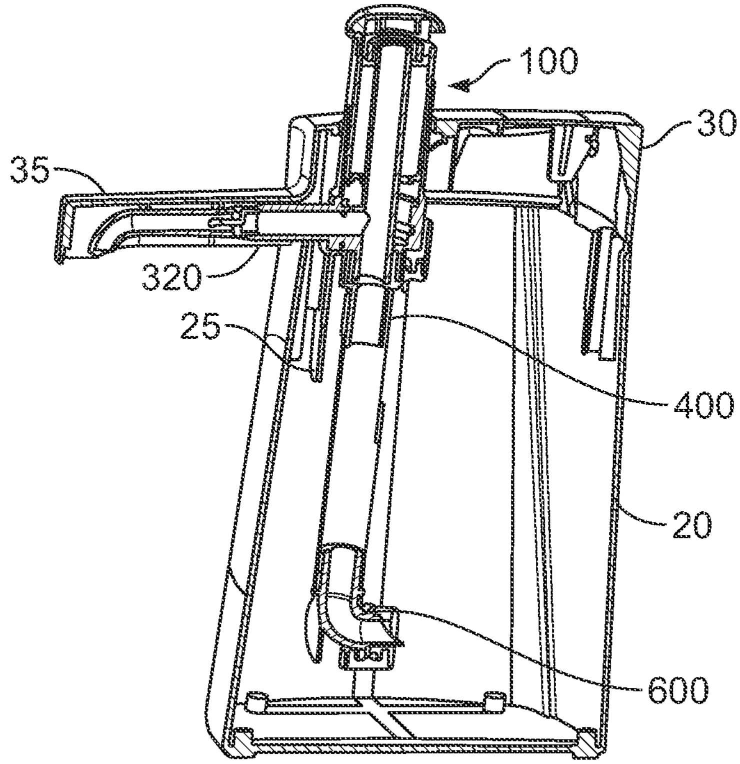
FIG. 1B is a cross sectional, perspective view taken along the central axis of the dispensing spout/nozzle, as indicated by line B-B in FIG. 1A. Note that FIG. 1B does not include the nozzle adapter shown in subsequent views.
Figure 2A:
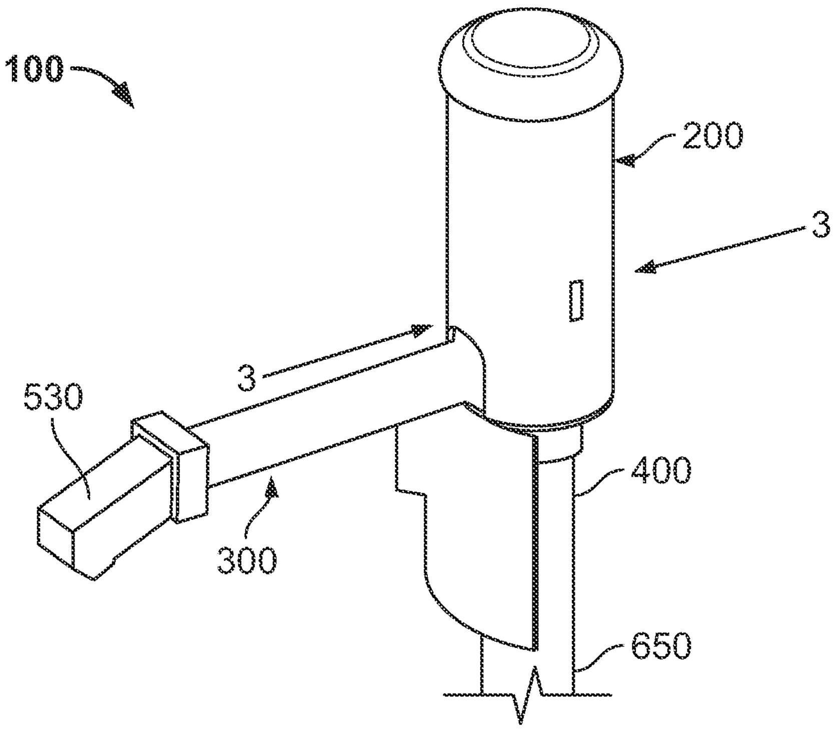
FIGS. 2A and 2B are complementary, three dimensional, perspective, sectional views of one aspect of the inventive pump from front and rear angles, specifically showing the pump chamber shroud and dispenser nozzle but excluding the lower portions of the dip tube.
Figure 2B:
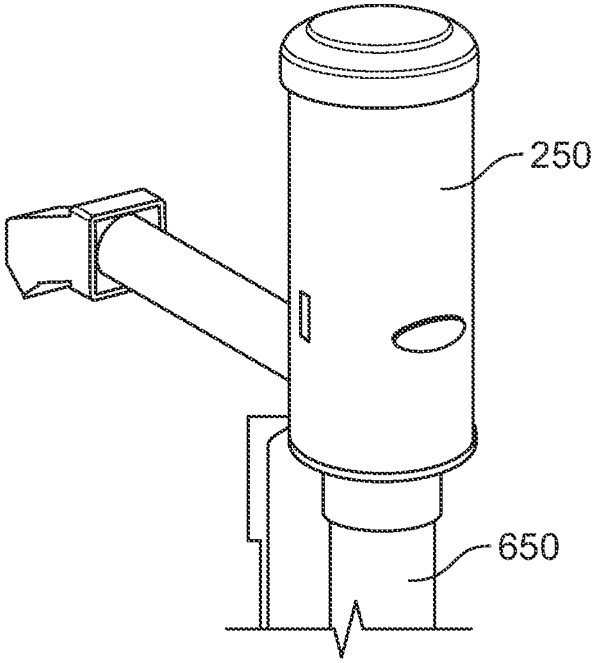
Figure 3A:
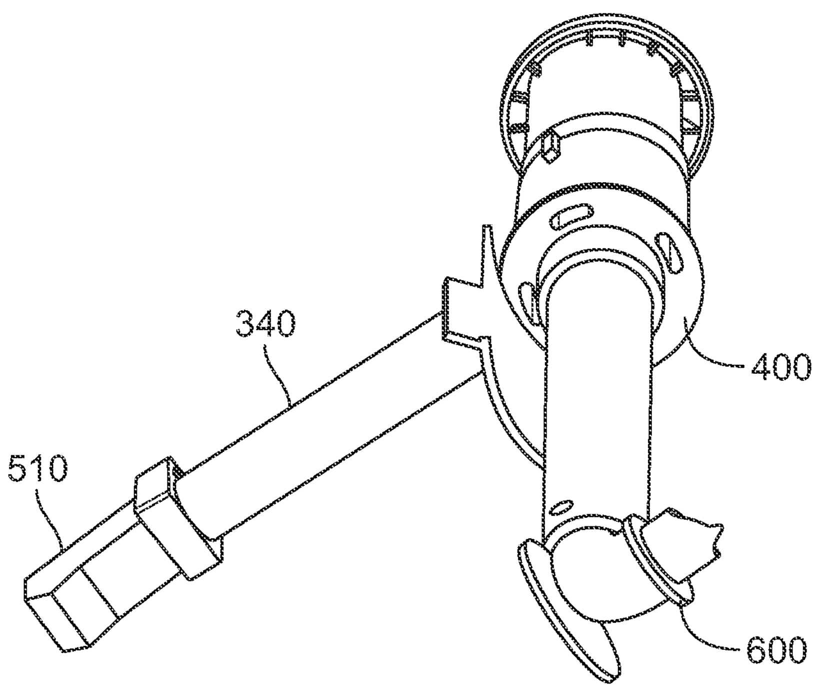
FIGS. 3A through 3E show various sectional perspective and cross sectional views of specific components depicted in FIGS. 1A through 2B as follows.
Figure 3B:
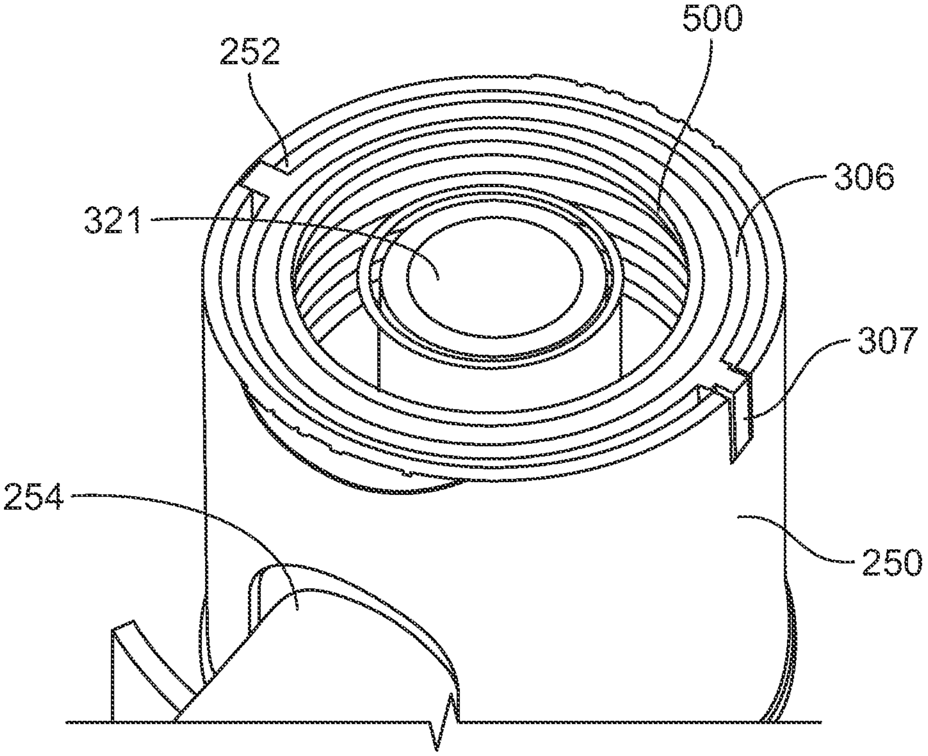
Figure 3C:
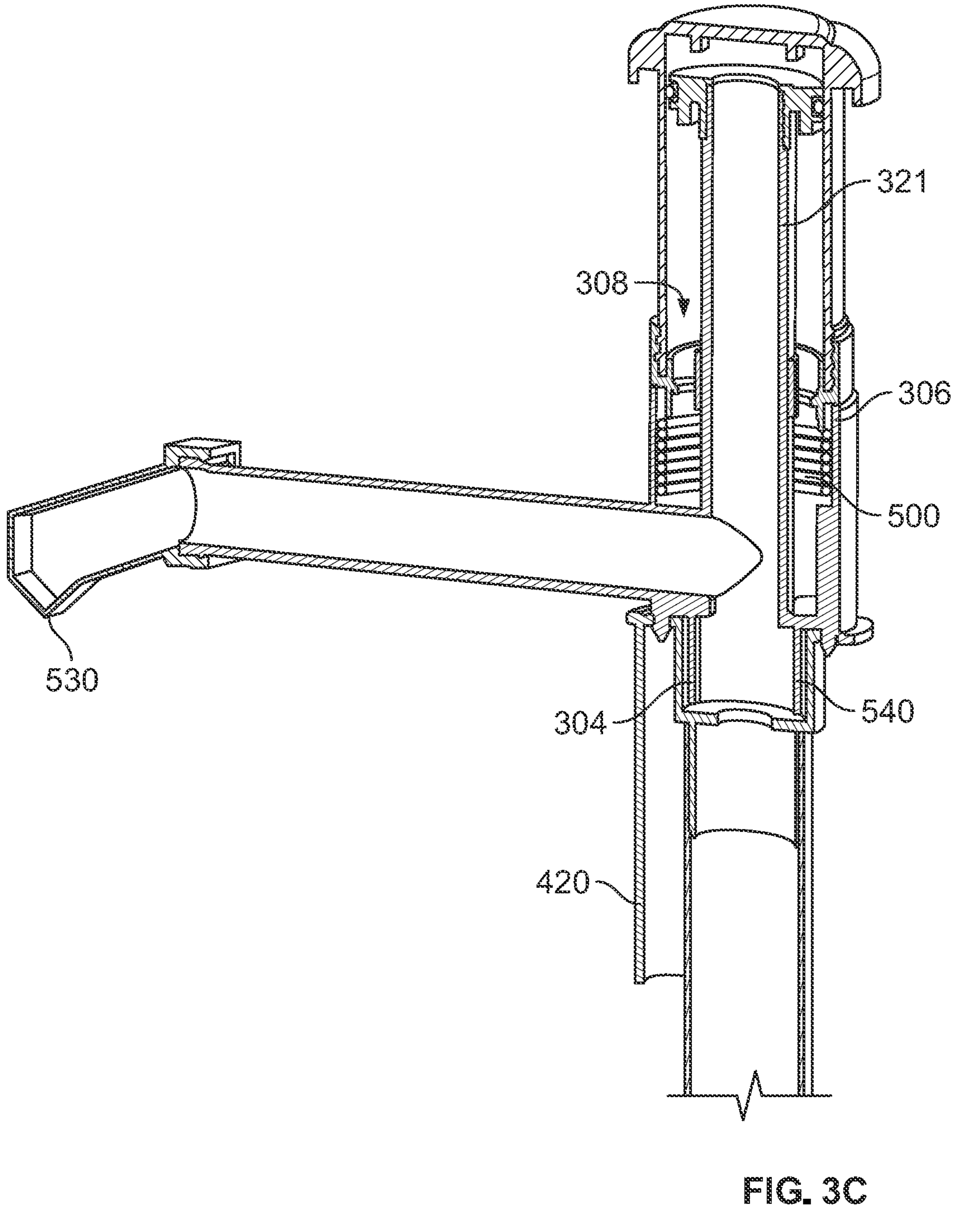
Figure 3D:
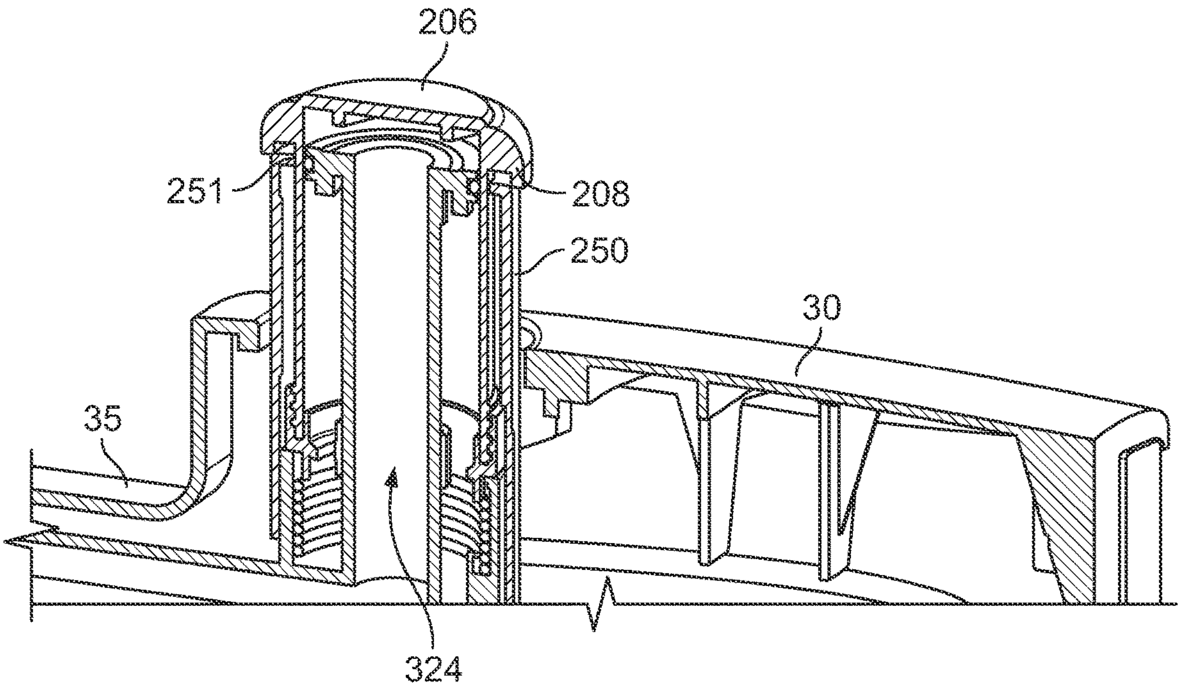
Figure 3E:
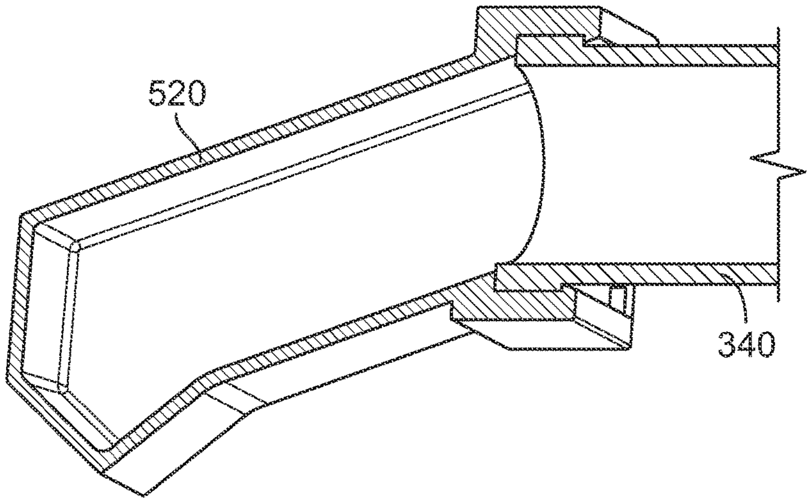
Figure 4A:
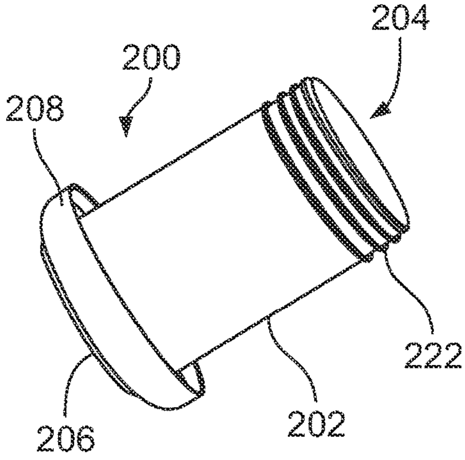
FIGS. 4A through 4I are three dimensional perspective views of isolated components of the pump as shown in in FIGS. 2A and/or 3A, with FIG. 4A showing the actuator cap, FIG. 4B the sliding seal cap, FIGS. 4C and 4D as complementary views of the pump body element, FIG. 4E the pump chamber shroud, FIG. 4F the nozzle adapter, FIG. 4G the piston attachment, FIG. 4H the inlet base attachment, and FIG. 4I the inlet valve piece.
Figure 4B:
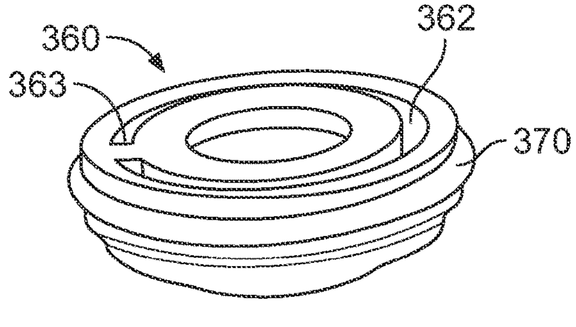
Figure 4C:
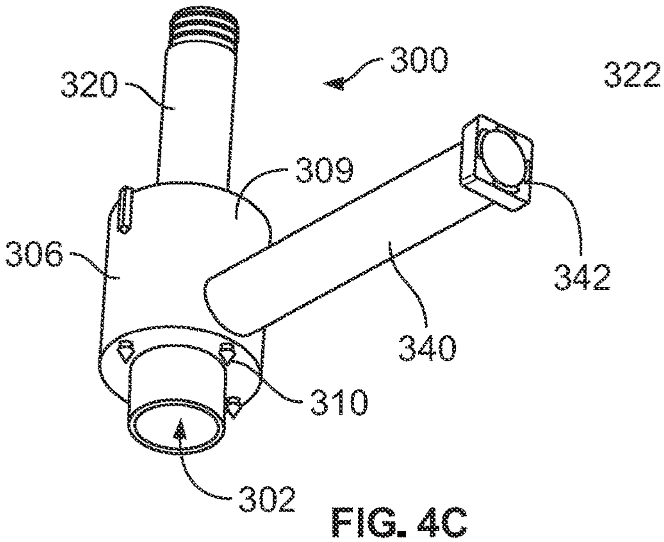
Figure 4D:
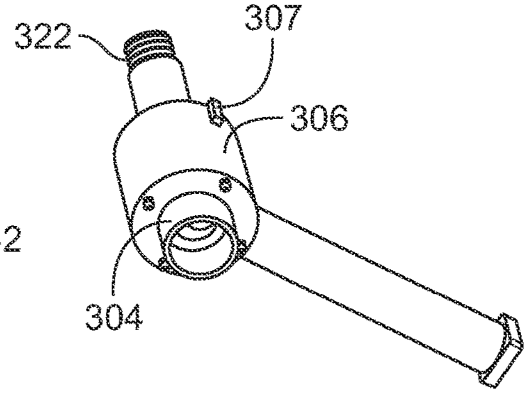
Figure 4E:
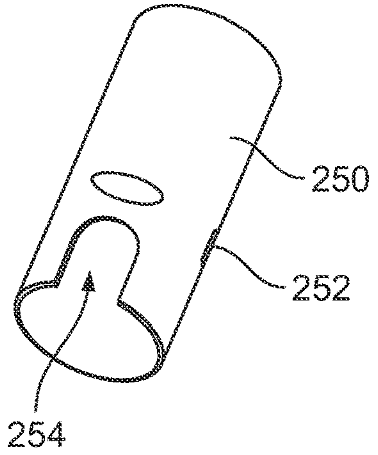
Figure 4F:
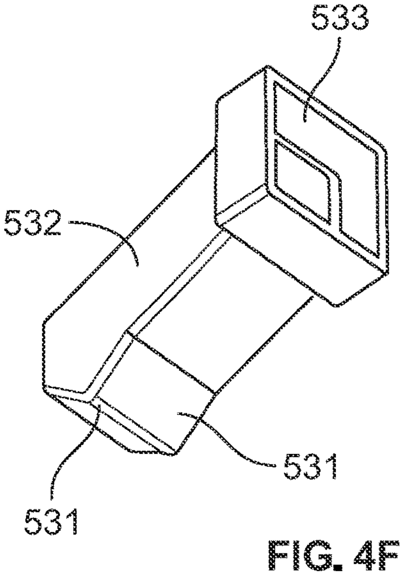
Figure 4G:
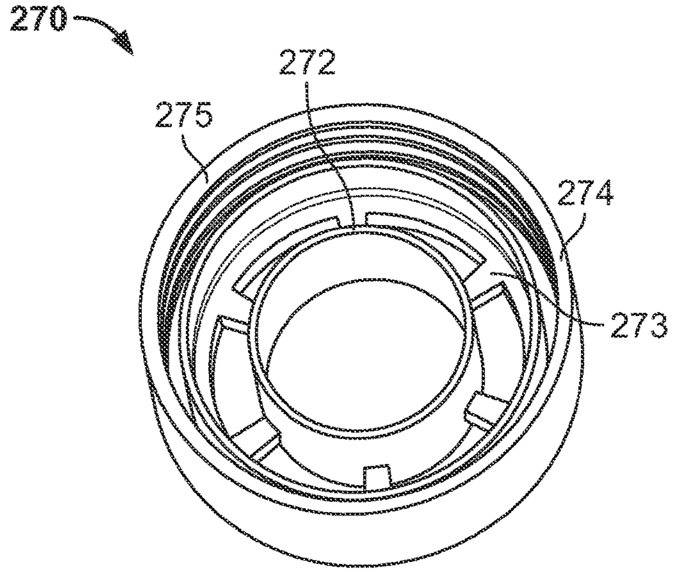
Figure 4H:
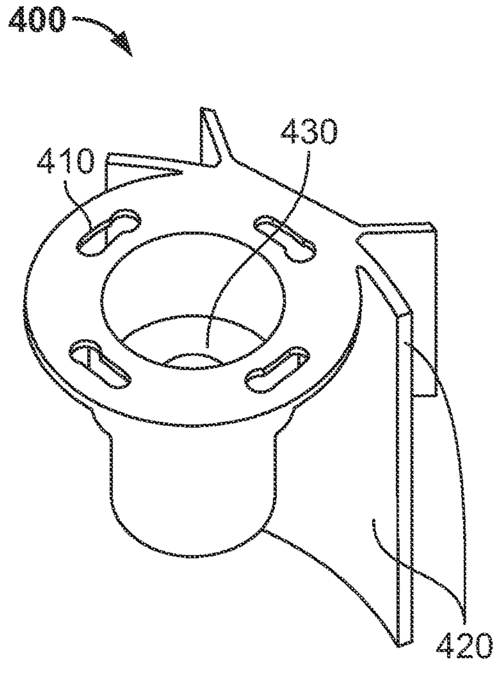
Figure 4I:
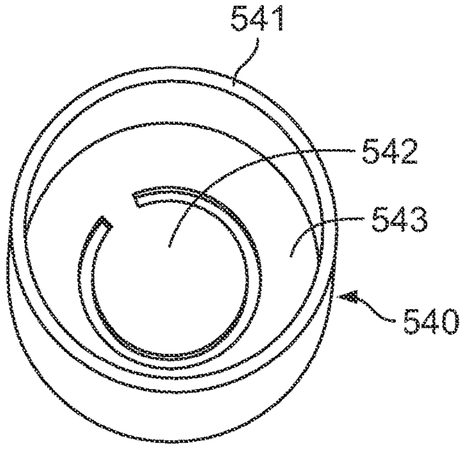

With further reference to FIGS. 1A through 4I, pump assembly 100 is primarily concealed in a decorative container arrangement 10. The arrangement 10 may include a container shell 20 which is sized to receive a pouch or bag (not shown) containing the fluid to be dispensed. A mounting element 25 is positioned on an inner facing of the container 20 to attach to the base element 400, preferably via a winged, bayonet-style connector that allows the pump 100 to be slid axially downward while securing the assembly and preventing unwanted lateral movement during use. Piercing element 600 penetrates and seals the assembly 100 to the bag so that fluid may be drawn from it and dispensed.

A lid 30 includes an aperture to accommodate the actuator 200 and an extension cover 35 fitted over the dispensing nozzle 340 of pump body 300. The lid 30 may be hinged, snap-fitted, or merely rest upon a ledge or other cooperating feature provided at the top edge of the container 20.

This arrangement 10 ensures the pump 100 can be fitted to containers of varying size/capacity. It also enables decorative elements to be affixed to the container 20 and/or lid 30 without altering the manufacture or operation of the pump 100. This type of approach is already employed with some conventional pumps, although these conventional pumps lack the advantages of the assembly 100 described herein.

With reference to only the pump assembly 100 as shown in FIGS. 2A through 4I, the main components are primarily (if not exclusively) made of common, easily formed/molded thermoplastic polymers. These components can be assembled and disassembled to one another without the need for any specialized tools or other implements, with the most significant elements involving a pump body 300 having a reciprocating actuator cap 200 and shroud/sleeve 250 fitted over a pump chamber extension 320. A biasing member 500 can urge the actuator 200 upward and away from the container/fluid source, while a dispensing nozzle 340 extends laterally at an angle relative to the pump chamber extension 320 (preferably, at a substantially orthogonal angle so as to impart an L-shape to body 300).

Body 300 includes one or more engagement features 310 proximate to the port 302 where fluid enters the body 300. Port 302 may be surrounded by a cylindrical wall 304 configured to be at least partially received in the base 400 and/or coupled to a dip tube 650. The features 310 may take the form of a series of posts or shaped projections positioned to cooperate with features 410, such as slots, grooves, or ports formed on the cooperating facing of the base 400 (conversely, the slots, grooves, or ports could be formed on the body 300 with posts or projections provided on the base 400). However, other coupling arrangements, such as threaded connections or snap-fitting bead-and-groove style elements could be used.

The body 300 includes a hollowed cylinder 306 that connects to the pump chamber extension 320 at its upper reaches and to the dispensing nozzle 340. This connection may impart an L-shape to the body 300, although the dispensing nozzle may be inclined or sloped away relative to the extension 320. In order to allow for the smoothest reciprocating motion, extension 320 is substantially vertical.

On an outer facing of the body 300, preferably on the upper portions of cylinder 306, keying projections 307 are provided. These projections 307 are configured to fit within and couple to ports 252 formed in the sleeve 250, so as to keep the sleeve 250 anchored to the body 300. In contrast, the actuator 200 associated with and fitting over the pump chamber extension 320 is configured to move axially upward and downward relative to body 300. This movement may be provided by a user grasping and manipulating the actuator 200 and/or a biasing member 500 could facilitate this action.

Cylinder 306 extends coaxially above and around the hollow tubular structure comprising the pump chamber extension 320. In some aspects, cylinder 306 completely encircles but is spaced apart from the extension 320 so as to form a skirt with a gap 308. Spring/biasing member 500 is seated and held within the gap 308 (with the spring resting on a horizontal surface spanning the gap 308 along its lower horizontal end), while the top edge 309 of the skirt serves as a lower-most stop to the axial movement of the piston 270 and actuator 200. Also, skirt 306 could be provided as a series of individual axially extending flanges or as a contiguous sidewall (as shown). Preferably, the inner and outer diameter of the skirt section 306 is larger than that of the cylinder 304 and most definitely must be larger than the outer diameter of the pump chamber extension 320.

Pump chamber extension 320 is a continuous, hollow tube, preferably smooth and straight along its inner facing. The inner volume defined by midsection 321 is where dispensed fluid is initial drawn upon actuation of the pump mechanism (i.e., the combination of actuator 200 and spring 500, in connection with the operation of inlet valve 542 and the outlet valve 530. At its upper edge, engagement features 322 facilitate a connection to sealing ring 360.

Piston 270 is an annular ring fitted concentrically/coaxially around the extension 320 to allow it to move axially up and down along midsection 321. Biasing spring 500 contacts the underside of the piston 270 urging it, and the actuator 200 to which it is detachably coupled, to move upward.

Piston 270 may consist of inner annulus 272 connected to outer annulus 274 by way of radial webbing 273. Both of the annulus 272, 274 include axially extending walls or flanges to facilitate contact and fitment within the components of the actuator 200, although the inner and outer surfaces should be smooth to allow for ease of motion. One of both of the radial facings on the outer annulus 274 includes coupling features 275, such a threads or beads/grooves, to detachably couple the piston 270 to the features 222. In this manner, piston 270 moves in concert as a singular element of the actuator 200.

Actuator 200 has a cup like shape, with an elongated, hollow cylindrical wall 202 connecting open end 204 to the top panel 206. Top panel 206 spans and seals the hollow portion so that, when the actuator is fitted over the extension 320 (and in further concert with the annular sealing ring 360, described below), the axial movement of actuator creates suction (on the upward motion) and pressure (on the downward motion) to urge fluids through the body 300 and into/out of the pump chamber 324 defined by extension 320.

Top panel 206 may include an annular flange or extension 208 extending beyond the outer diameter of the wall portion 202. In this manner, flange 208 can cooperate with the shroud 250 to limit the axial range of motion. Additionally or alternatively, the contact of piston/guide attachment 270 with the inner shoulder 251 at the upper end of the sleeve of the shroud 250 can serve a similar purpose, retaining the component. In the same manner, the top facing of the skirt 306 stops the downward motion of piston 270.

Sealing ring 360 is affixed at or near the terminal end of the extension 320. Ring 360 includes a sealing face 370, such as a gasket or smooth, sliding seal element, presenting around the outer-most periphery of some or all of the ring 360. A web 363 defines arcuate slots 362 that can receive axial fins extending downward from top panel 210 of cap 200. The central portion of the ring 360 includes sufficient apertures to allow the axial movement of top panel 206 to create suction. A groove and/or coupling features are disposed on a bottom facing and/or on inner/outer radial facings of the sidewalls defining the slots so that the ring 360 is detachably coupled to the extension 320.

A shroud 250 comprising a hollow tubular sleeve is fitted around the midsection 321 so as to conceal the actuator 200, piston 270, and pump body 300. Keying ports 252 are configured to cooperate with and receive the projections 307. A cutout 254 at the bottom edge of the sleeve accommodates the size and shape of the dispensing nozzle 340 to simplify assembly and fit of the components.

The sleeve itself is resilient and flexible. Thus, when the keying projections 307 are seated within the ports 252, compressive force applied at an angle will deflect the sidewalls of the sleeve 250 to dislodge the projections 307 and allow for removal of the shroud (by axial and/or rotational motions). With the stopping shoulder 251 now freely released, the entirety of the actuator 200 can also be slid upward, removed from the pump 100, and further disassembled and cleaned. In the same manner, the pump body 300, spring 500 and other internal components are also exposed and accessible for cleaning.

Dispensing nozzle 340 extends at an angle from extension 320 and cylinder 306. Nozzle 340 terminates in a shaped interface connector 342 configured to detachably couple to the nozzle adapter 520. In some aspects, adapter 520 elastically deforms to fit around the shaped interface 342, with polygonal shapes being particularly helpful by quickly orienting the outlet valve 530 in its preferred down-facing position. Nozzle 340 may be slightly inclined to cause fluid to flow back toward the body 300 and container, or it may slope away to urge fluid to be stored proximate the outlet 530 for quick dispensing action.

Nozzle adapter 520 includes an outlet valve 530. Valve 530 comprises a slit formed partially or complete along the intersection of angled, downward facing flat panels 531. Similar, cooperatingly shaped flat panels 532 are connected to define a flow path toward the valve 530, while a reinforce flange 533 connects to the nozzle dispenser 340 as described above. In certain aspects, flange 533 may be omitted or configured to include other coupling mechanism, such as screw threads, bayonet-style connections, and the like.

Upon buildup of fluid pressure caused by axial movement of the actuator 200 relative to the pump body 300, the panels 531 are forced apart so that the slit valve 530 is temporarily opened for dispensing of fluid. As the actuator reciprocates back to the extended position, the panels 531 are pulled back together so as prevent dripping and leakage from the valve 530.

Base element 400 attaches to the underside of the body 300 proximate to its inlet port 302. Winged and/or bayonet-style connecting elements 420 ensure a secure fit to the container 10, while a width-stepped port 430 captures the cup-shaped inlet element 540 between the base 400 and the body 300.

Inlet element 540 includes an axial wall 542 at its periphery and a flat panel 543 in which flap 542 may be formed. Flap 542 serves as an inlet valve to admit fluid from the pouch/container into the pump body 300.

Reinforcing ribs and/or thickened wall sections may be provided as appropriate as shown in the drawings and/or as necessary to enhance the localized strength of the components. Additionally, through judicious selection of appropriate materials (both relative to one another and in a absolute sense, with respect to their structural integrity), the various components described above can be optimized to improve performance and realize the benefits of the invention contemplated herein.

In terms of manufacture, the assembly reduces the number of parts in comparison to existing, commercially viable pumps, and it eliminates the need for specialized parts, such as duckbill valves and/or other items relying upon costly elastomeric materials and/or tortuous or otherwise difficult to access and clean passageways.

The pump has a fixed nozzle, and its components are or a modular nature to allow for the assembly, disassembly, and cleaning of each individual component. Thus, in its various aspects, a pump according to the invention may include any combination of the following features:

- a pump body element having a lower inlet end with lower engagement features, a dispensing nozzle, and a pump chamber extension with a skirt coaxially extending around a portion of the pump chamber extension at a defined gap and the skirt having one or more outer facing keying projections;
- an actuator cap comprising a hollow tube sealed at a top end by a top panel and having engagement features disposed at a lower end;
- a piston element configured to fit coaxially around the pump body extension, the piston element detachably coupled to the engagement features so that the piston element and the actuator cap move axially in concert around an outer facing of a portion of the pump chamber extension;
- a sealing ring detachably coupled to a top edge of the pump chamber extension and configured to sealingly engage an inner surface of the hollow tube;
- a unitary nozzle adapter including an outlet valve detachably coupled to a distal edge of the dispenser nozzle;
- a base detachably coupled to the lower engagement features;
- an inlet element interposed between the pump body element and the based unit element, the inlet element including an inlet valve;
- wherein the pump body extension and the dispensing nozzle form an L-shape;
- wherein the sealing ring includes a sealing member disposed on an outermost circumference;
- wherein a cooperating interface is formed between a web on an upper facing of the sealing ring and one or more axial projections e.g. fins formed on the top panel;
- wherein the axial projections e.g. fins are configured to be received in and engage portions of the web on the sealing ring to selectively prevent rotation and/or axial movement of the actuator cap relative to the pump body element;
- wherein the piston includes an inner cylinder guide attached by a web to an outer cylinder having engagement features detachably coupled to the engagement features of the actuator cap, the inner cylinder guide slidably engaging the pump chamber extension;
- wherein the lower engagement features form a bayonet-style connect to the base;
- wherein the base includes a winged connector attachable to a container;
- wherein the base includes a piercing element configured to fluidically connect to a pouch-style container;
- wherein the pump assembly is carried within a rigid container having a lid member with an aperture through which the actuator cap protrudes;

a shroud comprising a resilient sleeve coaxially enclosing the pump chamber extension, the skirt, and the piston element;

wherein the shroud includes one or more attachment apertures;

wherein the skirt includes one or more keying projections disposed on an outer facing of the skirt, the one or more keying projections detachably held within the attachment apertures;

wherein the sleeve deforms in response to compressive force to release the one or more keying projections from the attachment apertures;

wherein the shroud includes an inwardly projecting radial shoulder that defines an upper limit to the axial movement of the piston element;

wherein a top edge of the skirt defines a lower limit to the axial movement of the piston element cooperatingly shaped interface attaching the nozzle adapter and the distal edge;

wherein the cooperatingly shaped interface is substantially polygonal;

a biasing member disposed beneath the piston element within the defined gap, the biasing member urging the actuator cap into an axially extended position;

wherein a flow path is defined by interstices within the pump body element and the base and the axial movement of the actuator cap draws fluid through the inlet valve and dispenses fluid through the outlet valve;

wherein the outlet valve consists of a plurality of injection molded flat panel members;

wherein the outlet valve is a slit provided at an angled intersection of flat panels at the lowermost point of the outlet valve;

wherein the inlet valve is a flap valve attached along an arcuate portion to the inlet element;

and wherein the sleeve includes a cutout at a lower end, the cutout configured to fit around a top facing of the dispensing nozzle.

All components should be made of materials having sufficient flexibility and structural integrity, as well as a chemically inert nature. The materials should also be selected for workability, cost, and weight. In addition to the materials specifically noted above, common polymers amenable to recycling and manufacture by way of injection molding, extrusion, or other common forming processes should have particular utility, although metals, alloys, and other composites might be used in place of or in addition to more conventional container and closure materials.

References to coupling in this disclosure are to be understood as encompassing any of the conventional means used in this field. This may take the form of snap- or force fitting of components, although threaded connections, bead-and-groove, and slot-and-flange assemblies could be employed. Adhesive and fasteners could also be used, although such components must be judiciously selected so as to retain the underlying design goals inherent to the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Further aspects of the invention may be discerned from careful study of the features illustrated in the drawings. While structures that are most pertinent to the operation are highlighted above, still further functions and structures will be appreciated by skilled persons upon studying the drawings in their entirety. Also, certain drawings should be considered as made to scale, so that measurement of characteristics (length, width, height, volume, etc.) for two or more components may be scaled. Thus, ratios and relationships between specific components in the drawings also fall within the written purview of this disclosure.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A fixed nozzle dispenser pump having a modular construction for disassembly and cleaning, the dispenser pump comprising:

a pump body element having a lower inlet end with lower engagement features, a dispensing nozzle extending at an angle away from a pump chamber extension defining an inner volume to receive fluid through the lower inlet, and a skirt: i) formed integrally with the pump body, ii) coaxially extending around a portion of the pump chamber extension at a defined gap, and iii) having one or more outer facing keying projections;

an actuator cap comprising a hollow tube sealed at a top end by a top panel and having engagement features disposed at a lower end;

a piston element configured to fit coaxially around the pump body extension, the piston element detachably coupled to the engagement features of the actuator cap so that the piston element and the actuator cap move axially in concert around an outer facing of a portion of the pump chamber extension;

a sealing ring detachably coupled to a top edge of the pump chamber extension and configured to sealingly engaging an inner surface of the hollow tube;

a unitary nozzle adapter including an outlet valve detachably coupled to a distal edge of the dispenser nozzle;

a base detachably coupled to the lower engagement features of the body element;

an inlet element interposed between the pump body element and the based unit element, the inlet element including an inlet valve;

a shroud comprising a resilient sleeve coaxially enclosing the pump chamber extension, the skirt, and the piston element, the shroud having one or more attachment apertures so that one or more keying projections disposed on an outer facing of the skirt are: i) detachably held within the attachment apertures when the sleeve is assembled to the pump body, and ii) released when the sleeve is deformed by compressive force; and wherein the sealing ring prevents the piston element from coming into contact with the fluid in the inner volume.

2. The pump of claim 1 wherein the pump body extension and the dispensing nozzle form an L-shape.

3. The pump of claim 1 wherein the sealing ring includes a sealing member disposed on an outermost circumference.

4. The pump of claim 3 wherein a cooperating interface is formed between a web on an upper facing of the sealing ring and one or more axial fins formed on the top panel.

5. The pump of claim 4 wherein the axial fins are configured to be received in and engage portions of the web on the sealing ring to selectively prevent rotation and/or axial movement of the actuator cap relative to the pump body element.

6. The pump of claim 1 wherein the piston element includes an inner cylinder guide attached by a web to an outer cylinder having engagement features detachably coupled to the engagement features of the actuator cap, the inner cylinder guide slidably engaging the pump chamber extension.

7. The pump of claim 1 wherein the base includes a piercing element configured to fluidically connect to a pouch-style container and wherein the pump assembly is carried within a rigid container having a lid member with an aperture through which the actuator cap protrudes.

8. The pump of claim 1 wherein the shroud includes an inwardly projecting radial shoulder that defines an upper limit to the axial movement of the piston element and wherein a top edge of the skirt defines a lower limit to the axial movement of the piston element.

9. The pump of claim 8 wherein the sleeve includes a cutout at a lower end, the cutout configured to fit around a top facing of the dispensing nozzle.

10. The pump of claim 1 comprising a cooperatingly shaped interface attaching the nozzle adapter and the distal edge.

11. The pump of claim 1 further comprising a biasing member disposed beneath the piston element within the defined gap, the biasing member urging the actuator cap into an axially extended position.

12. The pump of claim 11 wherein a flow path is defined by interstices within the pump body element and the base and the axial movement of the actuator cap draws fluid through the inlet valve and dispenses fluid through the outlet valve.

13. The pump of claim 11 wherein the outlet valve consists of a plurality of injection molded flat panel members and wherein the outlet valve is a slit provided at an angled intersection of flat panels at the lowermost point of the outlet valve.

* * * * *